United States Patent [19]

Rode

[11] Patent Number: 5,569,967
[45] Date of Patent: Oct. 29, 1996

[54] MAGNETIC GEAR AND GEAR TRAIN CONFIGURATION

[75] Inventor: John E. Rode, Fonda, N.Y.

[73] Assignee: Temper Corporation, Fonda, N.Y.

[21] Appl. No.: 349,415

[22] Filed: Dec. 5, 1994

Related U.S. Application Data

[63] Continuation-in-part of Ser. No. 58,881, May 6, 1993, which is a continuation-in-part of Ser. No. 758,907, Sep. 11, 1991, Pat. No. 5,224,259.

[51] Int. Cl.⁶ .......................... H02K 49/00; H02K 15/00
[52] U.S. Cl. ...................... 310/103; 310/83; 74/DIG. 4; 74/640
[58] Field of Search .................. 74/DIG. 4, 640; 476/11; 310/103, 83, 152, 156, 75 D

[56] References Cited

U.S. PATENT DOCUMENTS

| | | | |
|---|---|---|---|
| 2,243,555 | 5/1941 | Faus | 310/103 |
| 3,304,449 | 2/1967 | Pohlman et al. | 310/103 |
| 3,523,204 | 8/1970 | Rand | 310/103 X |
| 3,792,578 | 2/1974 | Hetzel | 368/220 |
| 3,864,587 | 2/1975 | Landry | 310/103 |
| 3,938,914 | 2/1976 | Zimmermann | 310/104 X |
| 4,196,639 | 4/1980 | Spodig | 476/11 |
| 4,486,176 | 12/1984 | Tardieu et al. | 433/133 |
| 4,850,821 | 7/1989 | Sakai | 417/420 |
| 5,013,949 | 5/1991 | Mabe, Jr. | 310/83 |
| 5,224,259 | 7/1993 | Rode | 29/598 |
| 5,329,196 | 7/1994 | Rode | 310/156 |
| 5,367,862 | 12/1994 | Stevens | 310/75 D |

FOREIGN PATENT DOCUMENTS

| | | | |
|---|---|---|---|
| 898239 | 11/1953 | Germany | 476/11 |
| 451464 | 9/1949 | Italy | 310/103 |
| 55-86951 | 7/1980 | Japan . | |
| 4-160263 | 6/1992 | Japan . | |
| 544792 | 3/1977 | U.S.S.R. . | |
| 677049 | 5/1979 | U.S.S.R. . | |
| 907718 | 2/1982 | U.S.S.R. | 310/103 |
| 1620743A | 1/1991 | U.S.S.R. . | |

*Primary Examiner*—Khoi Q. Ta
*Attorney, Agent, or Firm*—Heslin & Rothenberg, P.C.

[57] ABSTRACT

A magnetic gear configuration utilizing non-metallic magnetic material about a circumference of a rotatable member is disclosed. A plurality of magnetic units may be spaced around the circumference of the rotatable member. Each magnetic unit may extend along a direction substantially parallel to the central axis of the rotatable member and each magnetic unit may be inversely aligned to its adjacent magnetic unit. The magnetic units may be equidistantly spaced from one another and each magnetic unit contains a north and south pole. Gear train configurations may be constructed by utilizing gears having similarly spaced magnetic units where inversely aligned magnetic units attract one another to facilitate gear rotation.

18 Claims, 6 Drawing Sheets

MAGNETIC GEAR AND GEAR TRAIN CONFIGURATION

CROSS-REFERENCE TO RELATED APPLICATION

This application is a continuation-in-part of U.S. patent application Ser. No. 08/058,881 filed on May 6, 1993, which is a continuation-in-part of U.S. patent application Ser. No. 07/758,907, filed on Sep. 11, 1991, now U.S. Pat. No. 5,224,259 issued on May 7, 1993.

BACKGROUND OF THE INVENTION

This invention relates to the field of gears and gear train configurations, and more particularly, to a magnetic gear and magnetic gear train.

Various mechanisms and machines commonly require gears in order to function as intended. However, gears commonly contain teeth which mesh with the teeth of other gears in order to impart rotation to one another. These types of gears, although suitable for high torque applications, exhibit substantial frictional forces between meshing teeth and are prone to wear and breakage. Moreover, conventional gears must be manufactured to exact precision and high tolerances in order to avoid slippage and transmission errors. Furthermore, excessive torque applied to a gear may often result in the gear teeth becoming broken or sheared due to the excessive force applied thereto and the inability of these gears to alleviate such forces. Typically, a shear pin or similar device is connected to the shaft of the gear to prevent damage to the mechanism due to excessive torque.

It is therefore an object of the present invention to provide a gear and gear train which may operate without the use of gear teeth.

It is also an object of the present invention to provide a gear and gear train which is particularly suitable for low torque transmission.

It is also an object of the present invention to provide a gear and gear train which minimizes the effect of frictional forces therebetween but which allows slippage between gears to occur without damage to the gears when the torque applied to one or more of the gears reaches a threshold level.

SUMMARY OF THE INVENTION

The magnetic gear may include a rotatable member having a non-metallic magnetic material affixed along a circumference thereof. The rotatable member has a first axial end and a second axial end. The non-metallic magnetic material may have a plurality of magnetic units spaced along a circumference thereof. The magnetic units may be oriented in a direction substantially parallel to a central axis of the rotatable member and including a north pole and a south pole. The magnetic units may be oriented about the circumference of the magnetic material and adjacent magnetic units may be inversely aligned thereby allowing alternate poles to be spaced along both the first axial end and second axial end about said circumference.

The aforementioned objects may be achieved using a magnetic gear constructed in accordance with the principles of the present invention.

The magnetic material may be affixed along an outer circumference of the rotatable member wherein a first face of the magnetic material is exposed.

The rotatable member may include a first flange located along the first axial end and a second flange located along the second axial end, and the non-metallic magnetic material may be mounted on the rotatable member between the flange and the second flange. The first and second flanges may include a lip protruding therefrom in a substantially axial direction.

The magnetic material may be affixed along an inner circumference of the rotatable member so that a second face of the magnetic material is exposed. A first flange may be located along the first axial end and a second flange located along the second axial end so that the non-metallic magnetic material may be mounted on the rotatable member between said first flange and said second flange. The first or second flanges may include a lip protruding therefrom in a substantially axial direction.

When forming a gear train the first rotatable member of a magnetic gear may contact a second rotatable member. The first rotatable member may be separated from the second rotatable member by a gap or may contact the second rotatable member.

The magnetic gear may also include ferretic ring or cylinder located between the rotatable member and the magnetic material.

A plurality of magnetic gears having similarly spaced magnetic units thereon may be aligned to form a gear train. Inversely oriented magnetic units of adjacent gears will attract to one another so that rotation can be transferred through the gears.

BRIEF DESCRIPTION OF THE DRAWINGS

The invention may be described with reference to the following detailed description and drawings in which.

DETAILED DESCRIPTION

Figure 1:
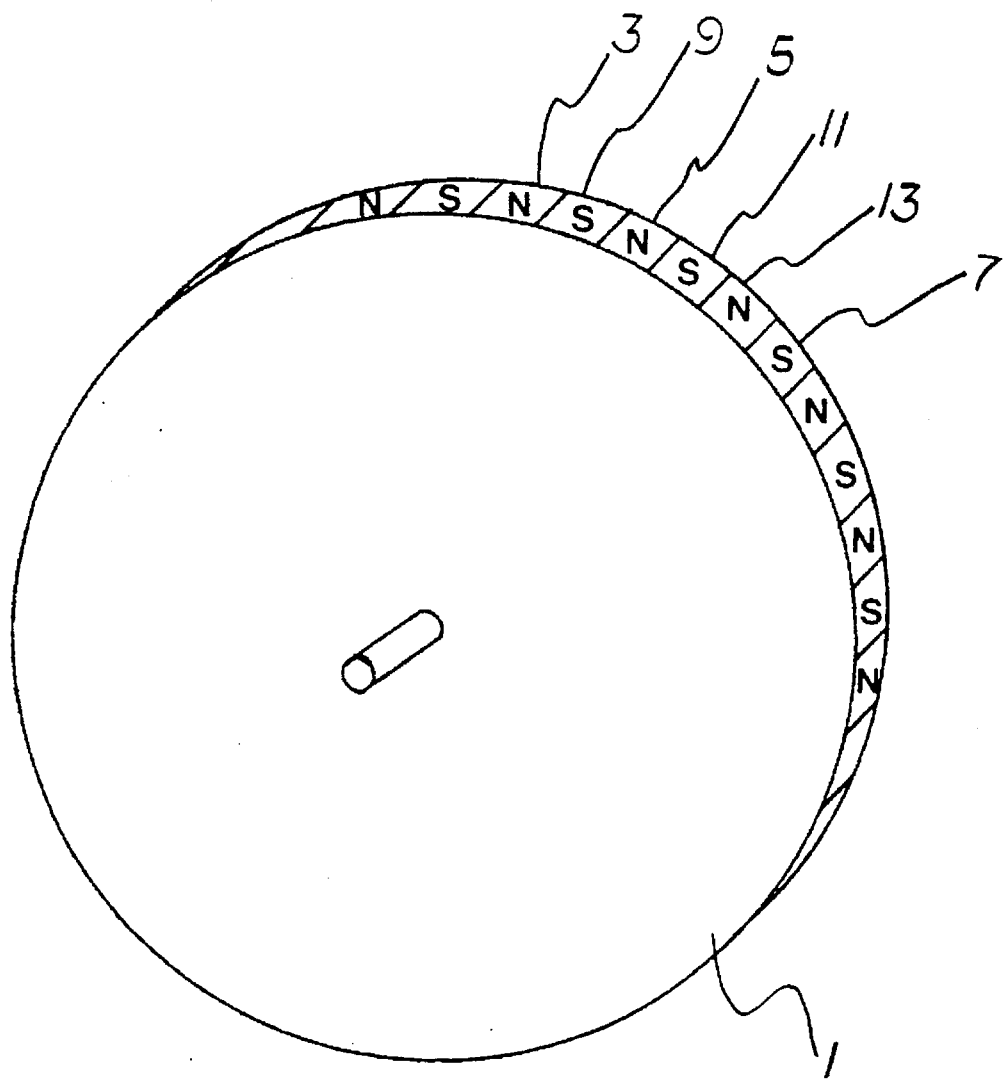
FIG. 1 depicts a magnetic gear having singular magnetic poles spaced across the circumference thereof.

FIG. 1 depicts a magnetic gear having a plurality of poles uniformly spaced along the circumference thereof. The poles alternate from north to south polarity about the entire circumference of the magnetic gear. The magnetic gear may be formed of a non-metallic magnetic material such as barium ferrite or neodymium-iron-boron. However, other materials which are capable of being magnetized to contain the desired polarity configuration thereon may be used. The magnetic gear 1 may be completely formed of the magnetic material. Alternatively, only the outer circumference of the magnetic gear 1 may be formed of the magnetic material. Around the circumference of the magnetic gear, north poles 3, 5, 7 are spaced equidistantly along the circumference of the gear 1. Located between each north pole are said south poles 9, 11, 13 also spaced equidistantly from one another. Each north pole is spaced equidistant from its adjacent southern poles.

Figure 2:
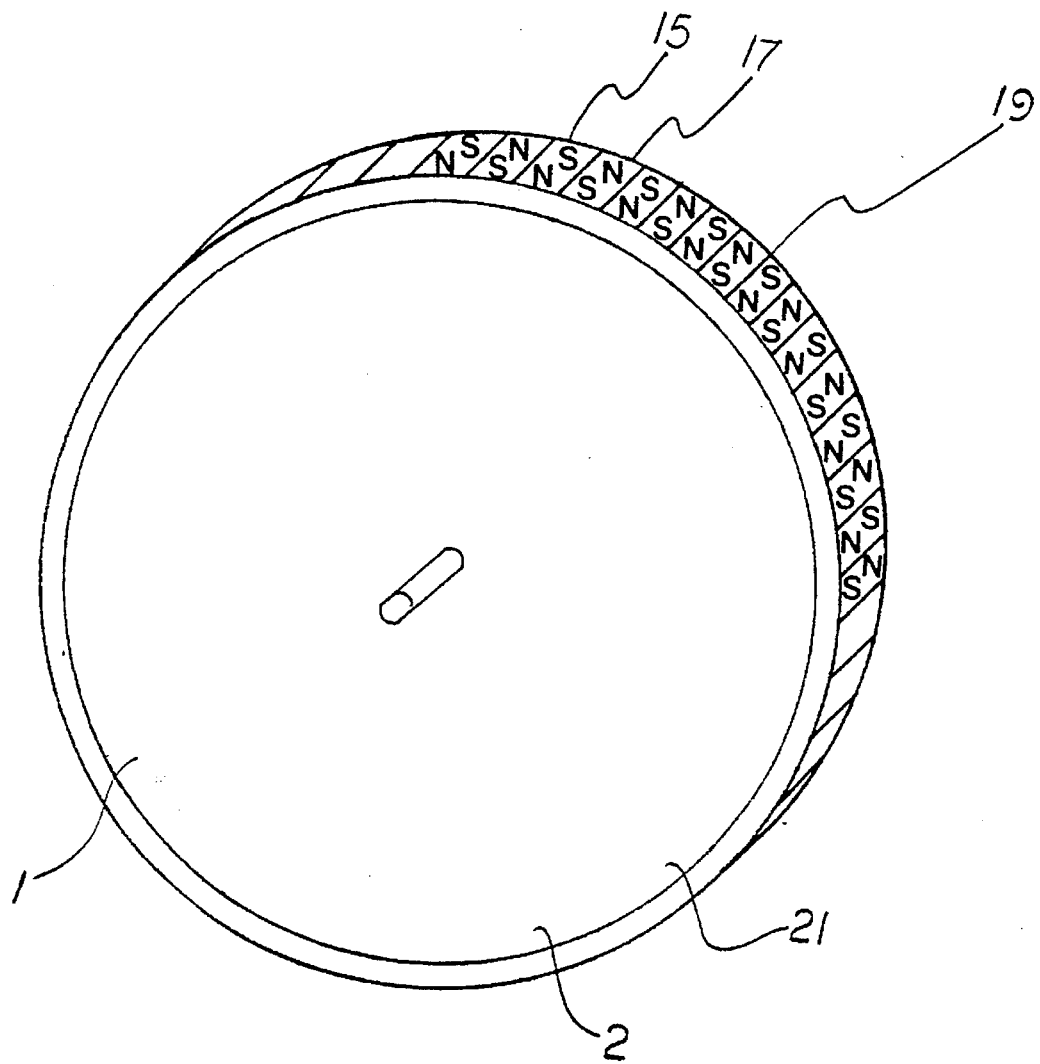
FIG. 2 depicts a magnetic gear having a non-metallic magnetic material along the outer circumference thereof and having a plurality of inversely oriented bi-polar magnetic units spaced along the outer circumference and constructed in accordance with the principles of the present invention.

Referring now to FIG. 2, an alternative embodiment of a magnetic gear constructed in accordance with the principles of the present invention is shown. The magnetic gear 1 contains a strip 2 or cylinder of non-metallic magnetic material such as barium-ferrite or neodymium-iron-boron oriented in a vulcanized nitryl rubber binder. The magnetic material may be magnetized in such a manner that magnetic units 15, 17 are oriented along the axial direction parallel to central axis A—A about the entire circumference of the magnetic gear 1. Each magnetic unit should be bipolar and contain a north pole and a south pole and one pole of each magnetic unit may be located along a first axial end 19 of the magnetic gear 1 while the opposite magnetic pole of each magnetic unit may be located at the second axial end 21 of the magnetic gear 1. The strip of non-metallic magnetic material may be magnetized in a magnetizing device such as those available from Magnetic Instrumentation, Inc. of Indianapolis, Ind. Additionally, the non-metallic magnetic material may be cut to its desired length using the techniques disclosed in U.S. patent application Ser. No. 08/058,881 filed on May 6, 1993. U.S. patent application Ser. No. 08/058,881 is hereby incorporated by reference and made a part of this disclosure herein.

Figure 3:
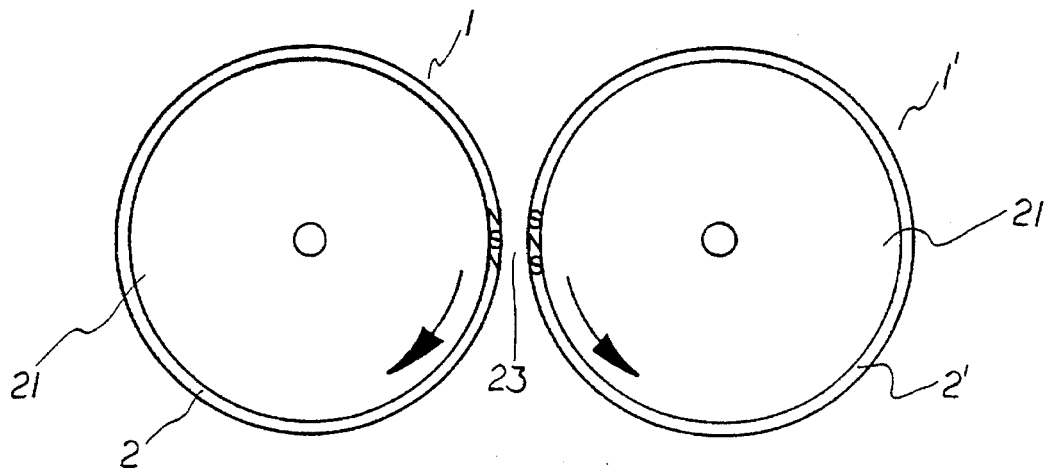
FIG. 3 depicts a gear train configuration constructed in accordance with the principles of the present invention.

Referring to FIG. 3, a magnetic gear train constructed in accordance with the principles of the present invention is shown. Each magnetic gear 1, 1' may contain a plurality of magnetic units such as those depicted and described in reference to FIG. 2 about the circumference thereof. The gears are aligned such that the magnetic units of the first gear 1 are inversely aligned with the magnetic units of the second gear 1' at the point 23 where the first gear 1 and second gear 1' mesh. At the point 23 where the gears mesh the axial aligned magnetic unit of the first gear 1 may have a south pole which is located at the first axial end 21 thereof. This south pole may attract the north pole of the magnetic unit of the second gear 1' located at the first axial end 21' at point of mesh 23. Although not shown in FIG. 3, the north pole of the magnetic unit of the first gear 1 attracts to the south pole (also not shown) of the magnetic unit at second gear 1' at the point of mesh 23.

Upon rotation of gear 1 in the clockwise direction, the magnetic unit thereof at mesh point 23 will travel downward and attract the magnetic unit of second gear 1' in the same direction causing second gear 1' to rotate in the counterclockwise direction. Upon further rotation of gear 1 in the clockwise direction, the magnetic unit immediately above point of mesh 23 of gear 1 will attract the magnetic unit of second gear 1' immediately above the magnetic unit at the point of mesh 23 thereby causing second gear 1' to continue rotation in the counterclockwise direction. The magnetic units of the first gear 1 which rotate towards point of mesh 23 contain north and south poles thereon which are inversely aligned to corresponding magnetic units and second gear 1' thereby having oppositely faced north and south poles thereby attracting one another to facilitate rotation of the second gear 1' upon rotation of the first gear 1.

Although as shown in FIG. 3, first gear 1 and second gear 1' are of similar diameter, each gear may be of a different diameter and rotation of one gear will facilitate rotation of another gear if the magnetic units of each gear are similarly spaced. As shown in FIG. 3, to minimize friction, it may be possible to mount the first gear 1 and second gear 1' so that there is a small gap at point of mesh 23. In this configuration, the first gear 1 and second gear 1' do not contact one another at point of mesh 23. Point of mesh 23 merely represents the point where the gears are closest to one another. By adjusting the intensity of the magnetic flux between inversely oriented magnetic units, which can be done by varying the degree of magnetization of the non-metallic magnetic material of each gear, the amount of torque capable of being transmitted from the first gear 1 to the second gear 1' can be varied.

Additionally, if the torque applied between each gear is above a threshold amount the magnetic units of each gear at the point of mesh 23 will become misaligned and the gears will slip until the torque between gears is reduced below the threshold amount at which point inversely oriented magnetic units of each gear will again align with one another so that the north poles and south poles of each magnetic unit on each gear will attract towards one another and continue rotation of both gears. Although not shown in FIG. 3, the first gear 1 and second gear 1' may contact one another at point of mesh 23 if desired and the same principles of the power transmission previously discussed may also be applicable.

Figure 4:
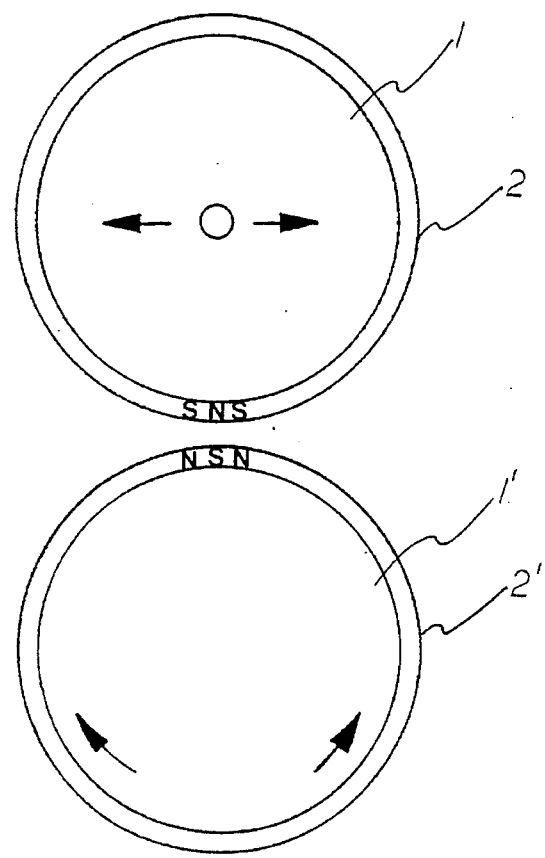
FIG. 4 depicts a gear train configuration including an inner planetary gear and outer planetary gear constructed in accordance with the principles of the present invention.

Referring now to FIG. 4, a gear train configuration constructed in accordance with the principles of the present invention where the gears are oriented in a planetary relationship is depicted. Planetary gear 1' may be suspended from stationary gear 1 without the use of bearings if the force of magnetic attraction between magnetic units at point of mesh 23 is sufficient to overcome the weight of gravity and acceleration. If the non-metallic magnetic material on each or both of the gears is magnetized to a degree where the magnetic attraction between the planetary gear 1' and stationary gear 1 is greater than the force of gravity and acceleration between each of the gears, then the gears may be in contact at point 23 and relative rotation of these gears will occur in the same manner as discussed supra relating to FIG. 3. However, if planetary gear 1' is not supported by a bearing means and if the torque applied between stationary gear 1 and planetary gear 1' is over a threshold amount, then the gears will slip relative to one another and planetary gear 1' will fall off of stationary gear 1.

Figure 5:
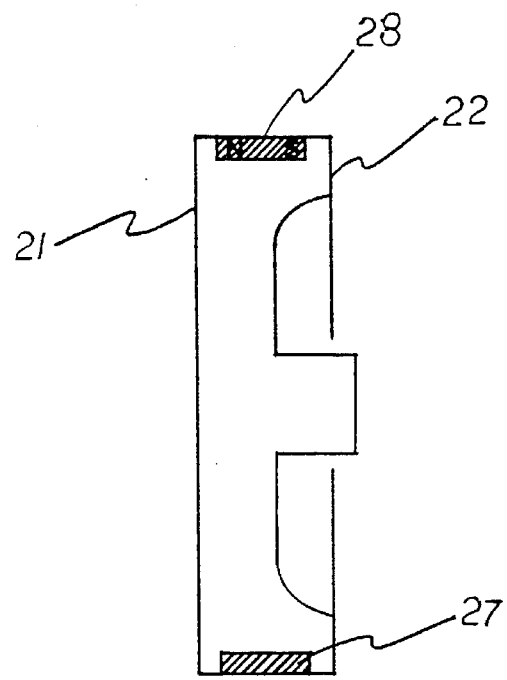
FIG. 5 depicts a sectional view of a magnetic gear constructed in accordance with the principles of the present invention.

Referring to FIG. 5, one embodiment of a magnetic gear constructed in accordance with the principles of the present invention is shown utilizing a sectional view of the same. The magnetic gear 1 contains a disc shaped member 25 having a groove around the outer circumference thereof. The non-metallic magnetic material 27 may be press-fit into the groove along the entire circumference of the member 25. Each magnetic unit of the non-metallic magnetic material 27 is preferably oriented parallel to central axis A—A of the magnetic gear and member 25. Each magnetic unit consists of a north pole and a south pole and as previously discussed each consecutive magnetic unit along the circumference of the magnetic gear is inversely oriented. As shown in FIG. 5, magnetic unit 28 contains a north pole towards the first axial end 21 of the magnetic gear 1 and a south pole towards the second axial end 22 of magnetic gear 1.

Figure 6:
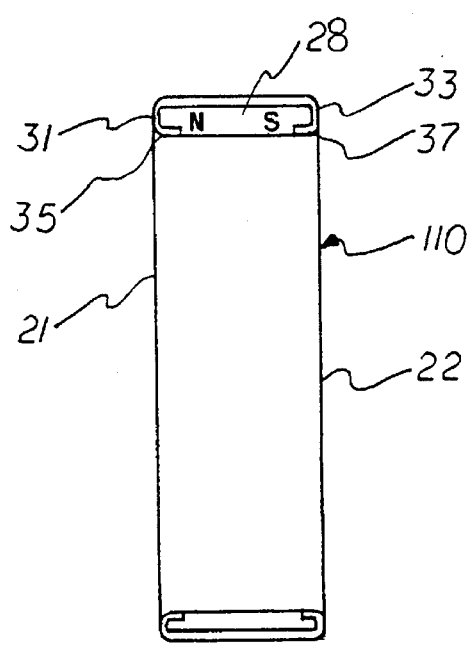
FIG. 6 depicts a sectional view of an alternate embodiment of a magnetic gear constructed in accordance with the principles of the present invention.

Referring to FIG. 6, an alternative embodiment of a magnetic gear constructed in accordance with the principles of the present invention is shown. This type of magnetic gear may be constructed as described in U.S. Pat. No. 5,224,259 issued on Jul. 6, 1993 and U.S. Pat. No. 5,329,196 issued on Jul. 12, 1994; each of these patents is hereby incorporated by reference and made a part of the disclosure herein. The magnetic gear 110 may contain a rotatable member 25 in the shape of a cylinder or ring. The member may be made of an austenitic stainless foil sheath. The magnetic material 27 is located within a channel formed between a first flange 31 extending along the entire circumference of the first axial end 21 of the magnetic gear and a second flange 33 extending along the entire circumference of the second axial end 22 of the magnetic gear 110. A first flange 31 may include a first lip 35 oriented in substantially the axial direction parallel to central axis A—A. Also, the second flange 33 may contain a second lip 37 extending in the axial direction parallel to central axis A—A. First lip 35 and second lip 37 each protrude in a direction towards one another from their respective flanges to support the magnetic material 27 in a channel formed along the inner circumference of member 25'. Again magnetic material 27 contains a plurality of magnetic units each having a north and south pole thereon. Magnetic unit 28 contains a north pole towards the first axial end 21 and a south pole towards the second axial end 22. Each magnetic unit spaced along the circumference of member 25' is inversely oriented relative to its adjacent magnetic unit.

Figure 7:
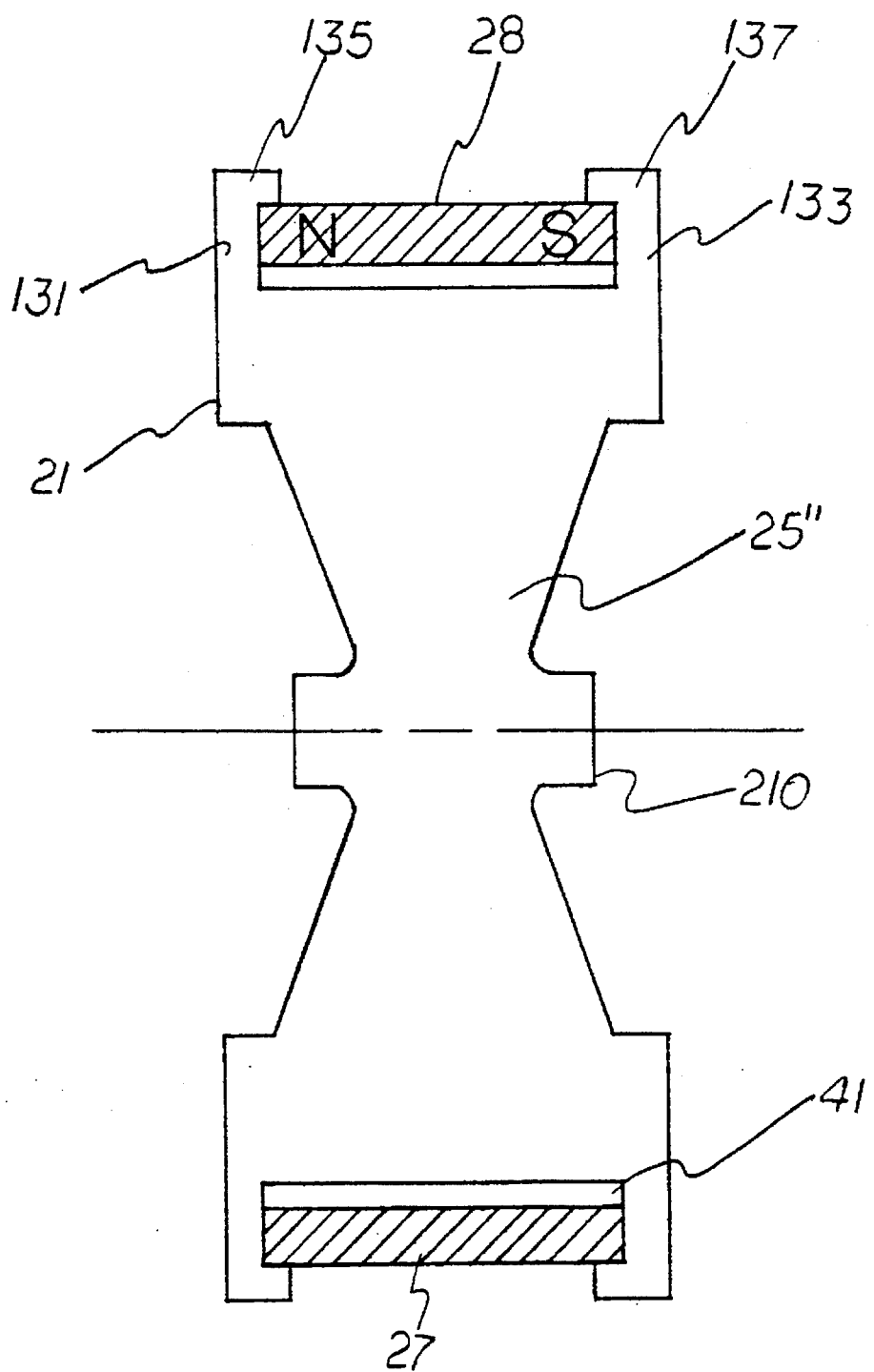
FIG. 7 depicts a sectional view of yet another embodiment of the magnetic gear constructed in accordance with the principles of the present invention.

Referring now to FIG. 7, a magnetic gear 210 includes a rotatable member 25" having a channel located about the outer circumference thereof and a non-metallic magnetic material strip within the channel about the entire outer circumference of the rotatable member 25". Mounted between the non-metallic magnetic material 27 and the rotatable member 25' may be a ferritic ring 41 to help intensify the magnetic flux. A first flange 131 located towards the first axial end 21 of the rotatable member 25" and a second flange 133 located towards the second axial end of the rotatable member 25" form a channel. The first flange 131 may include a first lip 135 protruding in the direction towards the second axial end 22. The second flange 133 may include a second lip 137 protruding towards the first axial end 21 of the rotatable member 25". The first lip 135 and second lip 137 are substantially oriented parallel to central axis A—A of the magnetic gear 210 and rotatable member 25" to form the channel about the outer circumference thereof and secure the non-metallic magnetic material therein. Again, the non-metallic magnetic material contains a plurality of magnetic units spaced inversely oriented relative to adjacent magnetic units and spaced about the length of the strip of magnetic material 27 and the circumference of the magnetic gear 210. Magnetic unit 28 contains a north pole oriented towards the first axial end 21 and a south pole oriented towards the second axial end 22.

Each of the specific constructions of the magnetic gears depicted in FIGS. 5–7 may be used in a manner to form a gear train such as those shown in FIGS. 3–4.

Figure 8:
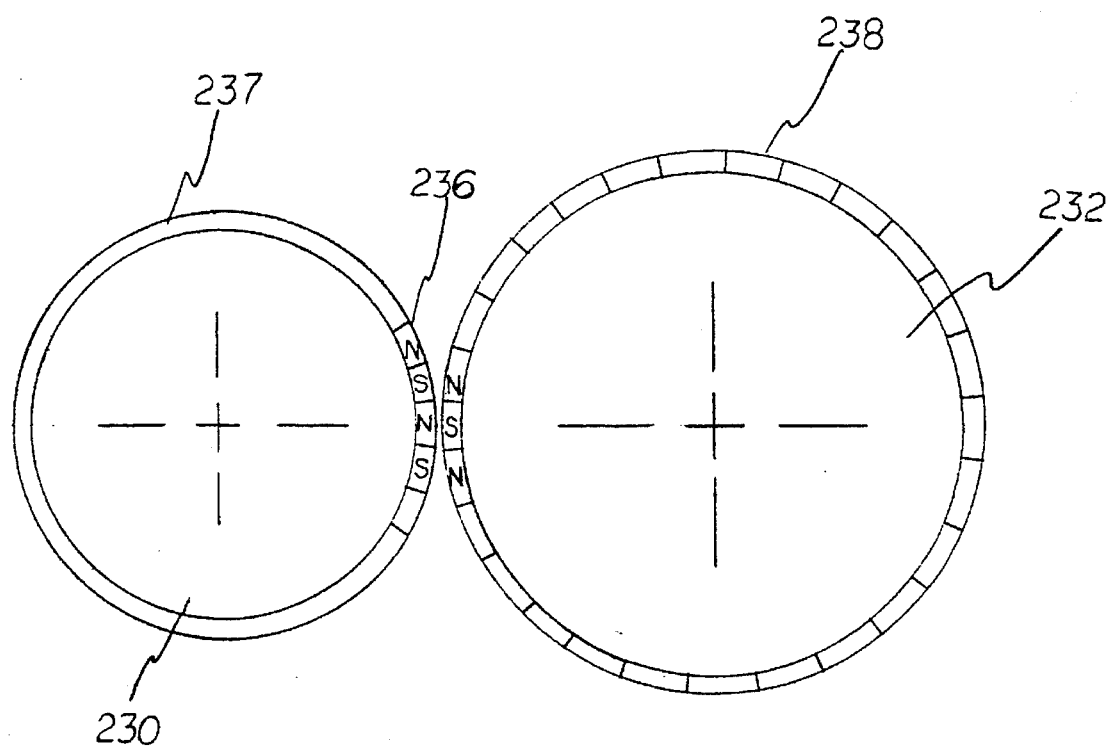
FIG. 8 depicts another gear train configuration where one gear has a portion of its circumference with a magnetic section and another portion of its circumference with a non-magnetic section.

Referring to FIG. 8, magnetic gears 230 and 232 form a gear train where the gear 230 has only a small portion of its circumference including a number of magnetic units 236 wherein the remainder of the circumference includes a non-magnetic sector 237. The engaging gear 232 has a continuous array of magnetic units 238. When the gear 230 is rotated so that magnetic sectors 236 are approximately tangent to the gear 232 the magnet gear will be engaged and the motion of gear 232 will then be controlled by the motion of gear 230. When the magnetic sectors of gear 230 are not proximal to the gear 232, the gear 232 motion is unrestrained by the motion of gear 230. This intermittent engagement is useful for certain mechanisms similar to Geneva mechanisms to create intermittent motion.

Although the invention has been disclosed in connection with the embodiments depicted herein, various modifications and substitutions may be made to these embodiments without departing in any way from the scope of the invention as defined within the following claims.

What is claimed is:

1. A magnetic gear having a substantially circular outer circumference comprising:

a rotatable member having a substantially continuous non-metallic magnetic material affixed along a circumference thereof, said rotatable member having a first axial end and a second axial end, said non-metallic magnetic material including a plurality of magnetic units spaced along a circumference thereof, each of said magnetic units being oriented in a direction substantially parallel to a central axis of said rotatable member and comprising a north pole and a south pole, said magnetic units being oriented about the circumference of the magnetic material wherein adjacent magnetic units are disposed in inverse polar alignment relative to one another thereby allowing alternate poles to be spaced along both the first axial end and second axial end about said circumference of said non-metallic magnetic material.

2. The magnetic gear of claim 1 wherein said magnetic material is affixed along an outer circumference of said rotatable member wherein a first face of said magnetic material is exposed.

3. The magnetic gear of claim 2 wherein said rotatable member comprises a first flange located along said first axial end and a second flange located along said second axial end, wherein said non-metallic magnetic material is mounted on said rotatable member between said first flange and said second flange.

4. The magnetic gear of claim 3 wherein at least one of said first and second flanges comprises a lip protruding therefrom in a substantially axial direction.

5. The magnetic gear of claim 1 wherein said magnetic material is affixed along an inner circumference of said rotatable member wherein a second face of said magnetic material is exposed.

6. The magnetic gear of claim 5 wherein said rotatable member comprises a first flange located along said first axial end and a second flange located along said second axial end, wherein said non-metallic magnetic material is mounted on said rotatable member between said first flange and said second flange.

7. The magnetic gear of claim 6 wherein at least one of said first and second flanges comprises a lip protruding therefrom in a substantially axial direction.

8. A magnetic gear train comprising:

a first rotatable member having a substantially circular outer circumference and having a substantially continuous non-metallic magnetic material affixed along a circumference thereof, said first rotatable member having a first axial end and a second axial end, said non-metallic magnetic material having a plurality of magnetic units spaced along a circumference thereof, each of said magnetic units being oriented in a direction substantially parallel to a central axis of said rotatable member and comprising a north pole and a south pole, said magnetic units being oriented about the circumference of the magnetic material wherein adjacent magnetic units are disposed in inverse polar alignment relative to one another thereby allowing alternate poles to be spaced along both the first axial end and second axial end about said circumference of said non-metallic magnetic material;

a second rotatable member having a substantially circular outer circumference and having a substantially continuous non-metallic magnetic material affixed along a circumference thereof, said second rotatable member having a first axial end and a second axial end, said non-metallic magnetic material having a plurality of magnetic units spaced along a circumference thereof, each of said magnetic units being oriented in a direction substantially parallel to a central axis of said circumference and comprising a north pole and a south pole, said magnetic units being oriented about the circumference of the magnetic material wherein adjacent magnetic units are disposed in inverse polar alignment relative to one another thereby allowing alternate poles to be spaced along both the first axial end and second axial end about said circumference of said non-metallic magnetic material;

said first rotatable member and second rotatable member being in magnetic contact with one another wherein a magnetic unit of said first rotatable member is disposed proximate a magnetic unit of said second rotatable member, said proximately disposed magnetic units being disposed in inverse polar alignment relative to one another whereby opposite poles thereof attract one another allowing one of said first and second rotatable members to rotate the other of said first and second rotatable members.

9. The magnetic gear train of claim 8 wherein said magnetic material is affixed along said outer circumference of each of said first and second rotatable members wherein a first face of said magnetic material is exposed.

10. The magnetic gear of claim 9 wherein at least one of said first and second rotatable members comprises a first flange located along said first axial end and a second flange located along said second axial end, wherein said non-metallic magnetic material is mounted on said at least one of said first and second rotatable members between said first flange and said second flange.

11. The magnetic gear train of claim 10 wherein at least one of said first and second flange comprises a lip protruding therefrom in a substantially axial direction.

12. The magnetic gear train of claim 11 wherein said magnetic material is affixed along an inner circumference of each of said first rotatable member and second rotatable member wherein a second face of said magnetic material is exposed.

13. The magnetic gear train of claim 12 wherein at least one of said first and second rotatable members comprises a first flange located along said first axial end and a second flange located along said second axial end, wherein said non-metallic magnetic material is mounted on said rotatable member between said first flange and said second flange.

14. The magnetic gear train of claim 13 wherein at least one of said first and second flanges comprises a lip protruding therefrom in a substantially axial direction.

15. The magnetic gear train of claim 8 wherein said first rotatable member is disposed in physical contact with said second rotatable member.

16. The magnetic gear train of claim 8 wherein said first rotatable member is physically separated from said second rotatable member by a gap.

17. The magnetic gear of claim 1 or 2 further comprising a ferretic ring or cylinder located between said rotatable member and said magnetic material.

18. The magnetic gear train of claim 8 or 9 further comprising a ferretic ring or cylinder located between each of said first and second rotatable members and said magnetic material.

* * * * *